(12) United States Patent
Kriebel et al.

(10) Patent No.: US 8,983,972 B2
(45) Date of Patent: Mar. 17, 2015

(54) COLLECTION AND REPORTING OF CUSTOMER SURVEY DATA

(71) Applicant: SAP AG, Walldorf (DE)

(72) Inventors: Sven Kriebel, Remchingen (DE); Carsten Heuer, Schriesheim (DE)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 13/632,506

(22) Filed: Oct. 1, 2012

(65) Prior Publication Data
US 2014/0095513 A1    Apr. 3, 2014

(51) Int. Cl.
  G06F 17/30    (2006.01)
  G06Q 30/02    (2012.01)
(52) U.S. Cl.
  CPC ............ *G06F 17/30* (2013.01); *G06Q 30/0203* (2013.01)
  USPC .......................................................... 707/748
(58) Field of Classification Search
  CPC ............................................... G06F 17/30011
  USPC .......................................................... 707/748
  See application file for complete search history.

(56) References Cited

U.S. PATENT DOCUMENTS

| 2005/0043985 | A1* | 2/2005 | Gillespie ..................... 705/10 |
| 2010/0262462 | A1* | 10/2010 | Tryfon .......................... 705/10 |
| 2012/0022905 | A1* | 1/2012 | Meyer et al. ................. 705/7.13 |

OTHER PUBLICATIONS

"Survey Tool", SAP Library, retrieved on Jan. 8, 2013, from help.sap.com/saphelp_crm40/helpdata/en/27/2ddf3ac9ecc11de10000000a11402f/content.htm, 2 pages.

* cited by examiner

*Primary Examiner* — Etienne Leroux
*Assistant Examiner* — Cindy Nguyen
(74) *Attorney, Agent, or Firm* — Brake Hughes Bellermann LLP

(57) ABSTRACT

The embodiments may provide a system for managing survey data including a survey metadata handler configured to receive survey metadata for a survey type, and a survey result handler configured to receive one or more completed or partially completed surveys providing one or more answers to questions corresponding to the survey type, a calculating unit configured to calculate one or more weighted answers based on the question weights and the one or more answers, and a satisfaction score for each completed or partially completed survey based on the one or more weighted answers, a category determining unit configured to determine a satisfaction category for the survey type based on the satisfaction scores and satisfaction category information mapping satisfaction categories to satisfaction scores for the survey type, and a database configured to store the survey metadata, the survey results, and the satisfaction category information, as a layered data model.

20 Claims, 7 Drawing Sheets

| | Access Context: | No Restrictions | | | | | | | | | | |
|---|---|---|---|---|---|---|---|---|---|---|---|---|
| | Calendar Day: | Last 3 years from Today | | | | | | | | | | |
| | Question: | 01st Question:02nd Question: | | | | | | | | | | ~126 |

| Average | | | | | | | | | | | | |
|---|---|---|---|---|---|---|---|---|---|---|---|---|
| | | Average | | | | | | | | | | |
| | Document\Question | 01st Question | 02nd Question | 03rd Question | 4th Question | 05th Question | 06th Question | 07th Question | 08th Question | 10th Question | Result | |
| Customer A | 0000035188 | 10,0 | 10,0 | 10,0 | 10,0 | 5,0 | 10,0 | 10,0 | 10,0 | 10,0 | 9,2 ■ |
| | 0000035203 | 10,0 | 9,0 | 10,0 | 9,0 | 10,0 | 9,0 | 9,0 | 9,0 | 9,0 | 10,0 ■ |
| | 0000035224 | 9,0 | 10,0 | 9,0 | 10,0 | 9,0 | 10,0 | 9,0 | 10,0 | 10,0 | 9,1 ■ |
| | 0000035225 | 10,0 | 10,0 | 10,0 | 8,0 | 10,0 | 10,0 | 6,0 | 6,0 | 6,0 | 10,0 ■ |
| | 0000035313 | 6,0 | 10,0 | 7,0 | | 7,0 | 8,0 | | | | 7,3 △ |
| | 0000035318 | | 8,0 | | | | | | | | 10,0 ■ |
| | 0000089164 | 10,0 | 10,0 | 10,0 | 10,0 | 10,0 | 10,0 | 10,0 | 10,0 | 10,0 | 8,8 ■ |
| | 0000089187 | 9,0 | 9,0 | 10,0 | 9,0 | 9,0 | 9,0 | 9,0 | 9,0 | 9,0 | 10,0 ■ |
| | 0000003941 | 10,0 | 10,0 | 7,0 | 10,0 | 10,0 | 10,0 | 10,0 | 10,0 | 8,0 | 9,4 ■ |
| | 0000099656 | 10,0 | 10,0 | 10,0 | 8,0 | 10,0 | 10,0 | 10,0 | 10,0 | 10,0 | 10,0 ■ |
| | 0000099657 | 10,0 | 10,0 | 10,0 | 10,0 | 10,0 | 10,0 | 10,0 | 10,0 | 10,0 | 10,0 ■ |
| | 0000090329 | 10,0 | 10,0 | 10,0 | 10,0 | 10,0 | 8,0 | 8,0 | 8,0 | 8,0 | 8,9 ■ |
| | 0000090502 | | 10,0 | 10,0 | 9,0 | 10,0 | 10,0 | 9,3 | 9,3 | 9,3 | 9,4 ■ |
| | Result | 9,6 | 9,6 ■ | 9,0 | 9,4 | 9,3 | 9,5 | | | | |
| Customer B | 0000035265 | 10,0 | 10,0 | 10,0 | 10,0 | 10,0 | 10,0 | 10,0 | | 10,0 | 10,0 ■ |
| | Results | 10,0 ■ | 10,0 ■ | 10,0 ■ | 10,0 ■ | 10,0 ■ | 10,0 ■ | 10,0 ■ | 10,0 ■ | 10,0 | 10,0 ■ |
| Customer C | 0000039347 | 10,0 | 10,0 | 10,0 | 10,0 | 10,0 | 10,0 | 10,0 | 10,0 | 10,0 | 10,0 ■ |
| | 0000039423 | 10,0 | 10,0 | 10,0 | 10,0 | 10,0 | 10,0 | 10,0 | 10,0 ■ | 10,0 | 10,0 ■ |
| | Results | 10,0 ■ | 10,0 ■ | 10,0 ■ | 10,0 ■ | 10,0 ■ | 10,0 ■ | 10,0 ■ | 9,6 | 10,0 | 10,0 ■ |
| Result | | 10,0 | 10,0 | 10,0 | 10,0 | 10,0 | 10,0 | 10,0 | | 10,0 | 10,0 ■ |

COLLECTION AND REPORTING OF CUSTOMER SURVEY DATA

BACKGROUND

Companies measure their customers' satisfaction and other customer feedback with the help of various surveys that are may be handed out and later returned when answered. In one example, a company may issue two different types of surveys to its customers in order to evaluate customer satisfaction, e.g., one survey may relate to the sales process (e.g., the customer purchased a product), and another survey may relate to the service process (e.g., a customer report, a support incidence). According to one conventional approach, the company may collect the completed surveys, and store the different types of surveys using different data structures. Also, not all questions of a survey may be equally important, and customers may not answer all questions of a survey. For example, with respect to a particular survey, customer A answers only one question of a survey, whereas customer B answers all the questions of the survey. According to one conventional approach, the resulting score for customer A and B may be calculated independently as the average of their answers, which may not take into account that the feedback given by customer B is much more relevant because more questions have been answered.

SUMMARY

Embodiments may provide a system for managing survey data. The system may include a survey metadata handler configured to receive survey metadata for a survey type, where the survey metadata may include description information for a plurality of questions, and question weights corresponding to the plurality of questions. The system may include a survey result handler configured to receive one or more completed or partially completed surveys corresponding to the survey type, where each completed or partially completed survey may include survey results providing one or more answers to the plurality of questions. The system may include a calculating unit configured to calculate one or more weighted answers based on the question weights and the one or more answers, and a satisfaction score for each completed or partially completed survey based on the one or more weighted answers, a category determining unit configured to determine a satisfaction category for the survey type based on the satisfaction scores and satisfaction category information mapping satisfaction categories to satisfaction scores for the survey type, and a database configured to store the survey metadata, the survey results, and the satisfaction category information, as a layered data model.

The calculating unit configured to calculate one or more weighted answers based on the question weights and the one or more answers may include multiplying an answer value by a corresponding question weight for each answer provided in each completed or partially completed survey. The calculating unit configured to calculate a satisfaction score for each completed or partially completed survey based on the one or more weighted answers may include calculating an average of the weighted answers. The calculating unit may be further configured to calculate an overall satisfaction score for the survey type based on a weighted average of all weighted answers. The survey metadata handler may be further configured to receive the satisfaction category information with the survey metadata.

The layered data model may include a first layer associated with the description information and the question weights, a second layer associated with the survey results and the satisfaction category information, and a third layer associated linking information configured to link application specific data with the survey results.

The system may include a report generator configured to generate a customer satisfaction report based on at least one of the survey results and the satisfaction category. The report generator may be further configured to access application specific data associated with an application, and generate the customer satisfaction report using the application specific data. The application specific data may include sales information associated with the survey type.

The embodiments provide a method for managing survey data performed by at least one processor. The method may include receiving, by the at least one processor, survey metadata for a survey type, where the survey metadata may include description information for a plurality of questions, and question weights corresponding to the plurality of questions. The method may further include receiving, by the at least one processor, one or more completed or partially completed surveys corresponding to the survey type, where each completed or partially completed survey may include survey results providing one or more answers to the plurality of questions. The method may further include calculating, by the at least one processor, one or more weighted answers based on the question weights and the one or more answers, and a satisfaction score for each completed or partially completed survey based on the one or more weighted answers, determining, by the at least one processor, a satisfaction category for the survey type based on the satisfaction scores and satisfaction category information mapping satisfaction categories to satisfaction scores for the survey type, and storing, by the at least one processor, the survey metadata, the survey results, and the satisfaction category information, as a layered data model.

The calculating one or more weighted answers based on the question weights and the one or more answers may include multiplying an answer value by a corresponding question weight for each answer provided in each completed or partially completed survey. The calculating a satisfaction score for each completed or partially completed survey based on the one or more weighted answers may include calculating an average of the weighted answers. The method may further include calculating, by the at least one processor, an overall satisfaction score for the survey type based on a weighted average of all weighted answers.

The receiving, by the at least one processor, survey metadata for a survey type may include receiving the satisfaction category information with the survey metadata. The layered data model may include a first layer associated with the description information and the question weights, a second layer associated with the survey results and the satisfaction category information, and a third layer associated linking information configured to link application specific data with the survey results.

The method further includes generating, by the at least one processor, a customer satisfaction report based on at least one of the survey results and the satisfaction category. The generating, by the at least one processor, a customer satisfaction report based on at least one of the survey results and the satisfaction category may include accessing application specific data associated with an application, and generating the customer satisfaction report using the application specific data. The application specific data may include sales information associated with the survey type.

The embodiments may provide a computer program product tangibly embodied on a non-transitory computer-readable storage medium and including executable code that, when executed, is configured to cause a system to receive survey metadata for a survey type, where the survey metadata may include description information for a plurality of questions, and question weights corresponding to the plurality of questions. The executable code may include instructions to receive one or more completed or partially completed surveys corresponding to the survey type, where each completed or partially completed survey may include survey results providing one or more answers to the plurality of questions. Also, the executable code may include instructions to calculate one or more weighted answers based on the question weights and the one or more answers, and a satisfaction score for each completed or partially completed survey based on the one or more weighted answers, determine a satisfaction category for the survey type based on the satisfaction scores and satisfaction category information mapping satisfaction categories to satisfaction scores for the survey type, and store the survey metadata, the survey results, and the satisfaction category information, as a layered data model.

The executable code may include instructions to calculate a satisfaction score for each completed or partially completed survey based on the one or more weighted answers includes calculating an average of the weighted answers.

The details of one or more implementations are set forth in the accompanying drawings and the description below. Other features will be apparent from the description and drawings, and from the claims.

BRIEF DESCRIPTION OF THE DRAWINGS

FIG. 6 illustrates a screen shot of an example report generated by the system of FIG. 1 according to another embodiment.

DETAILED DESCRIPTION

Figure 1:
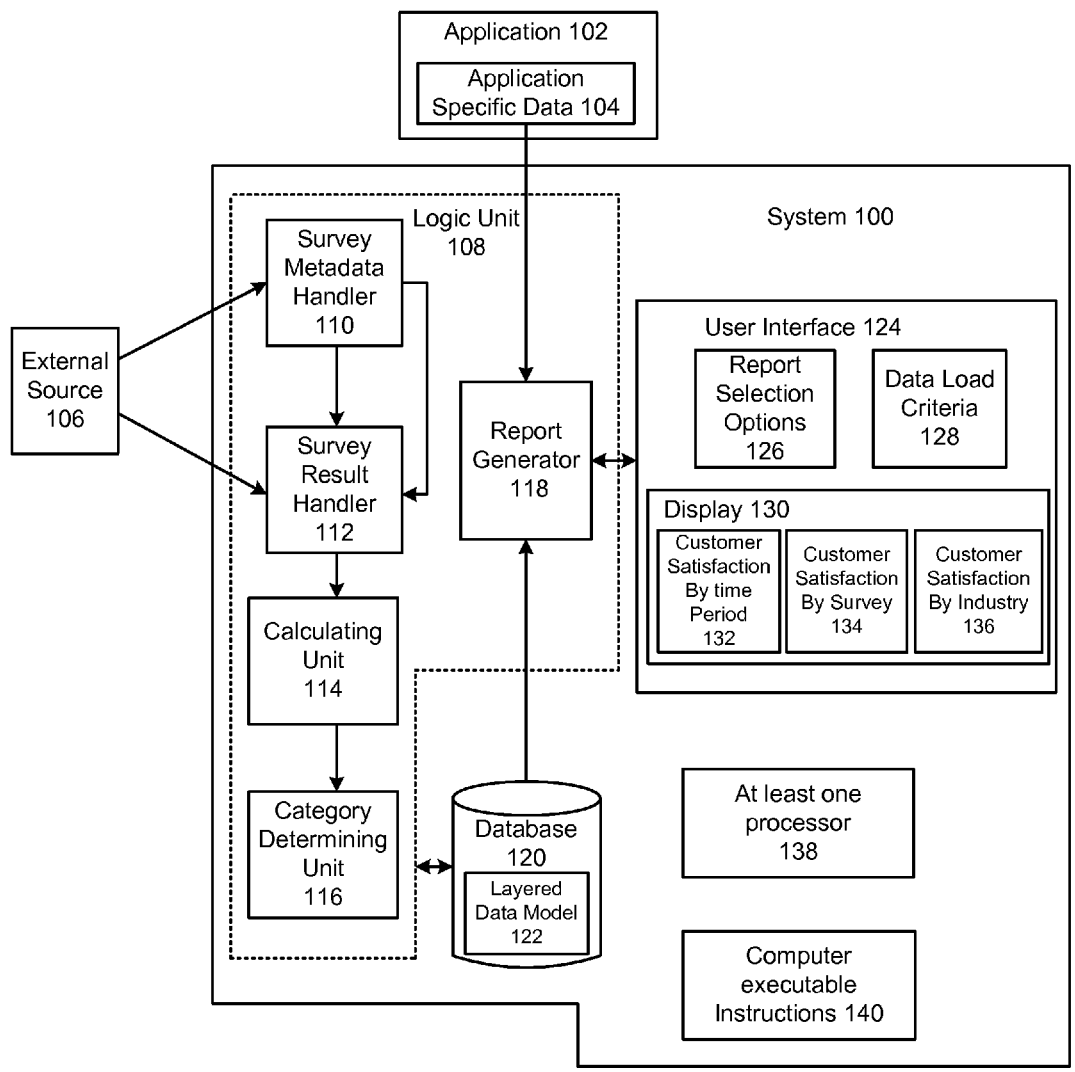
FIG. 1 illustrates a system for collecting and managing survey data according to an embodiment.

Embodiments provide a system that may collect and process surveys across different types of surveys, and store the survey results in a layered data model within a database (e.g., an in-memory database system) in order to allow for high-performance reporting and the calculation of satisfaction scores, satisfactory categories, as well as the dynamic weighting of questions. For instance, a company may define a customer survey to be utilized for the evaluation of customer satisfaction. The defined survey may include survey metadata, which may include the number of questions, the question weights associated with each question, and the textual description of the questions, among others, for example. Based on the survey metadata, the surveys are generated, and then presented to one or more customers of the company. In response, the company may receive survey results corresponding to the issued surveys such as one or more answers provided in response to the survey questions. The survey results may be uploaded to a database such as the in-memory database system to calculate the answer weights, the satisfaction score, and the satisfactory category during runtime. Further, various different types of reports may be generated based on the survey results and the calculations due to the data structure of the layered data model.

According to the embodiments, the system may collect the survey results in the layered data model. The layered data model is further illustrated with respect to FIG. 3. Also, it is noted that the system may collect survey results for a number of different types of survey (e.g., sales process topic, service process topic), and store the survey results for the different types of surveys in the layered data model. The data arrangement of the survey results into the layered data model may permit the dynamic weighting and the calculating of satisfaction scores and/or satisfaction categories across all the different types of surveys during runtime.

The layered data model may represent a plurality of layers. In one example, the survey results may be stored into the layered data model such that all generic survey data (e.g., which is common between all types of surveys) is stored in the lowest layer. The calculations that are required for the different types of reports may be stored in the second layer (e.g., answer values), while the third layer may be implemented to join application specific data (e.g., sales data), which may be independent from the specific surveys. Further, the embodiments encompass a survey specific mapping of the calculated satisfaction score to a generalized and comparable result (e.g. a satisfaction category). For example, the satisfaction score is computed (survey specific) with differently weighted questions, and this satisfaction score is then mapped at runtime to a comparable satisfactory category to enable reporting across different types of surveys. Further, to account for the varying relevance of answered surveys (e.g., different weights for different questions, varying number of answered questions per customer), the satisfaction score may be calculated in at least two ways (e.g., average of weighted answers, or average of scores per customer). These and other features are further explained with reference to the figures.

FIG. 1 illustrates a system 100 for collecting and managing survey data according to an embodiment. The system 100 may include a logic unit 108 for receiving and processing the survey data, a database 120 for storing the survey data as a layered data model 122, and a user interface 124 for selecting various criterion and options and displaying one or more reports in a display 130. In addition, the system 100 may include at least one processor 138, and computer executable instructions 140 that, when executed cause the at least one processor 138 to implement the components of the system 100. Further, the system 100 may include other components that are well known to one of ordinary skill in the art. Generally, the system 100 may collect and process survey data from an external source 106 in order to generate one or more customer satisfaction reports, e.g., customer satisfaction by time period 132, customer satisfaction by survey 134, and customer satisfaction by industry 136, which may be provided in the display 130. In addition, the system 100 may link application specific data 104 associated with an application 102 in order to provide a more detailed report that incorporates the application specific data 104 into the survey data. For example, the application specific data 104 may include sales information associated with a sales application, for example. As such, the system 100 may incorporate the sales information pertaining to the relevant survey data into the report in order to provide a more in-depth analysis of the survey results.

The survey data, received by the system 100, may include survey metadata and survey results. The survey metadata may represent a template of a survey type. The survey type may represent a survey topic such as a sales process survey or a service process survey. However, the embodiments encompass any type of survey topic related to a process or service provided by a company for an evaluation of customer satisfaction pertaining to one or more customers of the company. Essentially, the survey metadata provides the details of the survey such as the number of questions, the question weights associated with each question, and the textual description of the survey. In addition, the survey metadata may include satisfaction category information that maps satisfaction categories (e.g., satisfied, unsatisfied) to satisfaction scores. For example, as further explained below, during runtime, the system 100 may calculate a satisfaction score for each submitted survey, and then determine a general satisfaction category based on the satisfaction scores for all the submitted surveys for a particular survey type. The satisfaction category information provides the mapping between the satisfaction scores and the satisfaction categories. The system 100 may handle a variety of types of surveys. As such, each survey metadata received by the system 100 may correspond to a different survey type. The details of the survey metadata are further described with reference to FIG. 2. The received survey metadata corresponding to each survey type may be stored in the database 120 in the layered data model 122.

The company may define the details of the survey metadata in accordance with the layered data model 122, and present the survey defined by the survey metadata to one or more of its customers. Then, survey results may be received for each of the surveys submitted by the customers, which, generally, include one or more answers provided in response to the plurality of questions. The provided answers may be answer values such as integer values. In one example, the company may distribute the surveys to its customers in a hardcopy form, which is then return to the company. The survey results may be gathered, and provided to the system 100 by uploading a document file such as a spreadsheet that contains the survey results, for example. In this case, the company may wait for all (or some) the surveys to be submitted by the customers, and then forward the survey results to the system 100. Alternatively, the survey may be presented to its customers via the internet by utilizing a website, where a customer would visit the website, answer one or more questions of the survey, and submit a response. In this case, the survey results may be provided to the system 100 as each customer submits his/her response in real-time or near real-time. However, irrespective on how the survey is presented to the customers and how the survey results are collected from the customer, the survey results are loaded into the system 100. The survey results for a survey submitted by a particular customer may be referred to as a completed or partially completed survey. As such, for each survey type, there may be a plurality of completed or partially completed surveys, where each completed or partially completed survey corresponds to a different customer.

The survey metadata and the survey results may be embodied into various types of data formats. For example, the survey metadata and/or the survey results may be included in a document/file such as an Excel spreadsheet, WORD document, PDF document, or generally, any type of data format capable of representing the survey metadata or the survey results. The survey results may also be included in the same document/file, or may be represented by a separate document/file different from the survey metadata.

The external source 106 may be any type of outside source that provides the survey metadata and the survey results to the system 100. The external source 106 may include one or more computers/servers, each having at least one processor and computer-readable storage medium. In one example, the external source 106 may be a computer/server associated with the company that issues the surveys to its customers in order to evaluate customer satisfaction. Also, the external source 106 may represent a plurality of user computers who complete the surveys on-line via a website. Further, the external source 106 may be one or more computers/servers associated with the system 100 that stores the survey metadata and the survey results, which have been previously received. For instance, the external source 106 may store the survey metadata and the survey results, and the survey metadata and the survey results may be uploaded to the system 100, where the external source 106 and the system 100 share the same computer system. The user interface 124 may include the selection of various attributes of the loading of the survey metadata/survey results, e.g., by virtue of selecting the appropriate data load criteria 128.

The logic unit 108 may provide the functionalities of receiving the survey results/survey metadata, storing the survey results/survey metadata in the database 120 as the layered data model 122, calculating/determining one or more parameters (e.g., satisfaction score, satisfaction category), and generating one or more reports. For example, the logic unit 108 may include a survey metadata handler 110 for receiving the survey metadata, a survey result handler 112 for receiving the survey results, a calculating unit 114 for calculating weighted answers and satisfaction scores, a category determining unit 116 for determining satisfaction categories, and a report generator 118 for generating one or more reports for reviewing on the display 130 of the user interface 124.

The survey metadata handler 110 may be configured to receive the survey metadata from the external source 106. For example, the survey metadata handler 110 may upload the survey metadata to the system 100 from the external source 106. In one example, the survey metadata handler 110 may receive a spreadsheet document that contains the survey metadata for a particular survey type. As such, the survey metadata handler 110 may receive a separate spreadsheet document for each type of survey. The survey metadata handler 110 may receive the survey metadata one time or at the beginning of an instantiation of a survey. However, the survey metadata handler 110 may receive updates or new survey metadata in the event that the survey metadata has changed (e.g., a different weight for a particular question, number of questions, etc.).

The survey result handler 112 may be configured to receive the completed or partially completed surveys, e.g., the survey results. In other words, the survey result handler 112 may receive the answer values to the plurality of questions. The survey results may include answer values and corresponding textual descriptions of the answers. As such, the survey result handler 112 may receive one or more completed or partially completed surveys corresponding to each survey type handled by the system 100 (e.g., for which survey metadata is received). Each completed or partially completed survey may include one or more answers corresponding to the appropriate survey. In one example, the survey result handler 112 may receive the completed or partially completed survey(s) with the survey metadata. Alternatively, the survey result handler 112 may receive the completed or partially completed survey(s) after the survey metadata is received by the survey metadata handler 110.

The calculating unit 114 may be configured to perform calculations on the survey results, e.g., the completed or partially completed surveys 220. For example, the calculating unit 114 may be configured to calculate one or more weighted answers based on the question weights provided in the survey metadata and the answers provided in the completed or partially completed surveys. For example, the calculating unit 114 may calculate the weighted answer by multiplying an answer value by a corresponding question weight for each answer provided in each completed or partially completed survey.

Also, the calculating unit may calculate a satisfaction score for each completed or partially completed survey based on the one or more weighted answers. A satisfaction score may represent a level of satisfaction pertaining to each survey or survey type. In one example, the calculating unit 114 may calculate an average of the weighted answers. Also, the calculating unit 114 may calculate an overall satisfaction score for the survey type based on a weighted average of all weighted answers. Table 1, provided below, illustrates the average of the weighted answers and the overall satisfaction score for the survey type.

example, for each completed or partially completed survey (Survey 1, Survey 2, and Survey 3), the calculating unit 114 may calculate the satisfaction score by computing an average of answer values, and/or computing an average of the weighted answers. Also, the calculating unit 114 may calculate an overall satisfaction score for the survey type according to either the average score or the average of weighted answers, e.g., the bottom row.

The category determining unit 116 may be configured to determine a satisfaction category for the survey type based on the calculated satisfaction scores for the completed or partially completed surveys and satisfaction category information. For instance, the satisfaction category information may be the customer-defined parameters that map different satisfaction categories to satisfaction scores. Generally, the satisfaction category information maps different categories (e.g., very satisfied, satisfied, unsatisfied, etc.) to different satisfaction scores, or a range of satisfaction scores. Therefore, depending on the calculated satisfaction scores, the category determining unit 116 may determine a particular satisfaction category.

TABLE 1

| Document Question | 01st Question | 02nd Question | 03rd Question | 04th Question | 05th Question | 06th Question | 07th Question | 08th Question | 10th Question | 12th Question | Overall Result |
|---|---|---|---|---|---|---|---|---|---|---|---|
| Survey 1 | 10.00 | 10.00 | 10.00 | 10.00 | 10.00 | 9.00 | 9.00 |  | 10.00 | 2.00 | 9.83 |
| Survey 2 | 1.00 | 1.00 | 10.00 | 1.00 | 10.00 |  |  |  | 1.00 |  | 3.40 |
| Survey 3 | 10.00 | 10.00 | 10.00 | 10.00 | 10.00 | 10.00 | 10.00 | 10.00 | 10.00 | 2.00 | 10.00 |
| Overall Result | 7.00 | 7.00 | 10.00 | 7.00 | 10.00 | 9.50 | 9.50 | 10.00 | 7.00 | 0.00 | 8.08 |

Table 1 illustrates three surveys for a particular survey type, e.g., survey 1, survey 2, and survey 3. For each of the surveys, the weighted answer is provided for each question, e.g., question 1, 2, 3, 4, 5, 6, 7, 8, 10, 11, and 12 (e.g., in this case, questions 9 and 11 were dropped). In this example, the weighted answer is in the range of 0.0 to 10.0. According to an embodiment, the calculating unit 114 may calculate the satisfaction score for a particular completed or partially completed survey by calculating an average of the weighted answer values for each survey, which is the far right column—the overall result. For example, for Survey 1, the satisfaction score has been calculated as 9.83. Also, the calculating unit 114 may calculate the average score for the questions within a particular survey type, which is the bottom row—overall result. For example, with respect to question 1, the calculating unit 114 may calculate the satisfaction score for question 1 by calculating an average of the weighted answers for Survey 1, Survey 2 and Survey 3 related to question 1, e.g., 7.0. However, the bottom right entry is the weighted average of the overall result. For example, the calculating unit 114 may calculate an overall satisfaction score for the survey type by calculating the weighted average of the overall result for the survey type, which, in this example, is 8.08.

Table 2 illustrates the satisfaction scores according to another embodiment.

TABLE 2

|  | Average Score | Average of Weighted Answers |
|---|---|---|
| Survey 1 | 9.83 | 9.83 |
| Survey 2 | 3.40 | 3.40 |
| Survey 3 | 10.00 | 10.00 |
| Overall Result | 7.74 | 8.08 |

For example, Table 2 illustrates the satisfaction score as the average score or the average of weighted answers. For Also, it is noted that the satisfaction category is defined per survey. As such, satisfaction categories along with the mappings between satisfaction scores and satisfaction categories may vary between survey types. Therefore, a generic satisfaction category is introduced that maps the survey specific category (i.e. "what the customer thinks") to the overall category (i.e. "what does this mean for my company").

The report generator 118 may generate one or more customer satisfaction reports based on at least one of the survey results and the satisfaction category. For example, the report generator 118 may generate a customer satisfaction by time period report 132, a customer satisfaction by survey 134 report, and a customer satisfaction by industry 136. However, the report generator 118 may generate any type of report using the survey results and the satisfaction category. For example, the user may be provided with report selection options 126, and upon selection of these options, the report generator 118 may generate a report that summarizes the survey results along with the satisfaction categories and/or satisfaction scores. In addition, the report generator 118 may include detailed information from the application specific data 104 such as detailed sales information. For example, the application specific data 104 may be linked to the survey results based on linking information provided in the layered data model 122, which is further explained with reference to FIG. 3. As such, the report generator 118 may be able to provide a more in-depth report. Specific examples of the reports are further illustrated in FIGS. 5-7.

The database 120 may be any type of database capable of storing data in a layered manner. In one particular embodiment, the database 120 may include in-memory database system that stores the survey metadata, the survey results, and the satisfaction category information as the layered data model 122. The in-memory database may be a type of database system that supports real-time analytics and transactional processing including replication and aggregation techniques. The in-memory database may include a parallel processing data store that utilizes row-based, column-based, and/or object-based storage techniques. In one embodiment, the in-memory database may be HANA Enterprise 1.0 (any other versions) that is developed by SAP.

The user interface 124 provides the display 130 of the different types of generated reports such as the customer satisfaction by time period 132, the customer satisfaction by survey 134, and the customer satisfaction by industry 136, for example, as well as the report selection options 136, which may permit the user to define the type of report. In addition, the user interface 124 may provide the data load criteria 128, which provides options for uploading the survey results/survey metadata.

Figure 2:
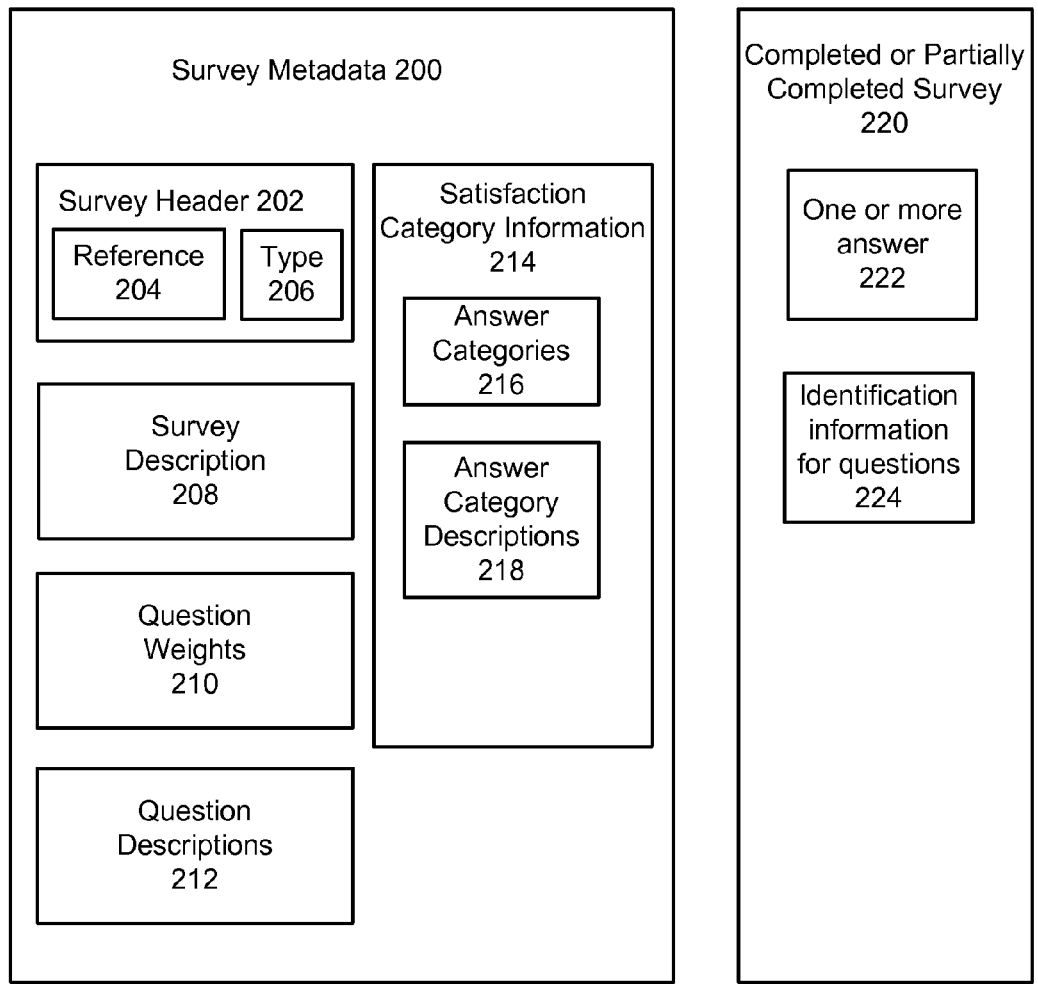
FIG. 2 illustrates survey metadata and a completed or partially completed survey that are received by the system of FIG. 1 according to an embodiment.

FIG. 2 illustrates survey metadata 200 and a completed or partially completed survey 220 (e.g., survey results) according to an embodiment. Referring to FIG. 2, the survey metadata 200 may include a survey header 202 having a reference 204 and a type 206, survey description 208, question weights 210, question descriptions 212, and satisfaction category information 214 having answer categories 216 and answer category descriptions 218.

As indicated above, the survey metadata handler 110 may upload the survey metadata for specific surveys. The survey metadata will typically be used only once for a given survey since the survey metadata is supposed to remain stable during the survey's life time. However, it may be possible to re-load the survey metadata or updated survey metadata, which will delete and overwrite the previously loaded survey metadata.

The survey header 202 is defined by the reference 204 and the type 206. The reference 204 may include a globally unique identifier (GUID) that represents a reference object (e.g., customer relationship management (CRM) campaign, or a customer ramp-up), or the technical identifier of any object that the survey refers to. Essentially, the reference 204 may link the survey to an object. The type 206 represents the technical type of the survey's reference document. It is used by the system 100 to filter the survey data so that it is possible to link a survey to the application specific data 104, which may be different types of sales documents.

The survey description 208 includes information describing the type of survey including language information indicating the type of language and textual information indicating the text for the type of survey. The type of language may indicate the language of the survey such as English, German, or French, among others, for example. The textual information provides the actual description of the survey such as "Survey for Customer Service for purchased products."

The question weights 210 may include identification information for questions (e.g., 224) such as the technical identifier of each question, and question weights corresponding to the questions. The question weights may include a numerical value such as a decimal value representing the weight assigned to each question in the survey. As such, each question weight may be paired with a technical identifier corresponding to the question.

The question descriptions 212 may include information providing a textual description of the questions and the corresponding technical identifier of each question. Further, the questions description 212 may include the type of language associated with each question.

The satisfaction category information 214 may include information for mapping satisfaction scores to satisfaction categories. In one example, a plurality of satisfaction categories may be defined such as excellent, above-average, satisfactory, below average, unsatisfactory, etc. The satisfaction categories may be pre-defined by the user, and indicate an overall degree of satisfaction relating to a particular survey type. According to the embodiment, the satisfaction category information 214 may map a satisfaction score or a range of satisfaction scores to a particular satisfaction category.

Further, as shown in FIG. 2, the satisfaction category information 214 may include answer categories 216 and answer category descriptions 218. For instance, the answer categories 216 may assign satisfaction categories to answer values. Each possible answer (e.g., an integer value) may relate to a corresponding satisfaction category. In this case, the answer value may act as a key when generating reports. The answer category descriptions 218 provide the description for the satisfaction category, which may include the answer value, the language of the description, and the actual textual description for each satisfaction category. Also, it is noted that it may be permissible to maintain different descriptions to satisfaction categories that belong to more than one answer value. However, typically, each answer value that maps to the same satisfactory category have the same description, otherwise the report result may not be defined.

Also, referring to FIG. 2, the survey results may include one or more completed or partially completed surveys 220. Each completed or partially completed survey 220 may include one or more answers 222 and identification information 224 for the corresponding questions. The answers 222 may include answer values, which may be a numerical value such as an integer, for example. In addition, the completed or partially completed survey 220 may include the identification information 224 for each question, which may be the technical identifier of the question.

Figure 3:
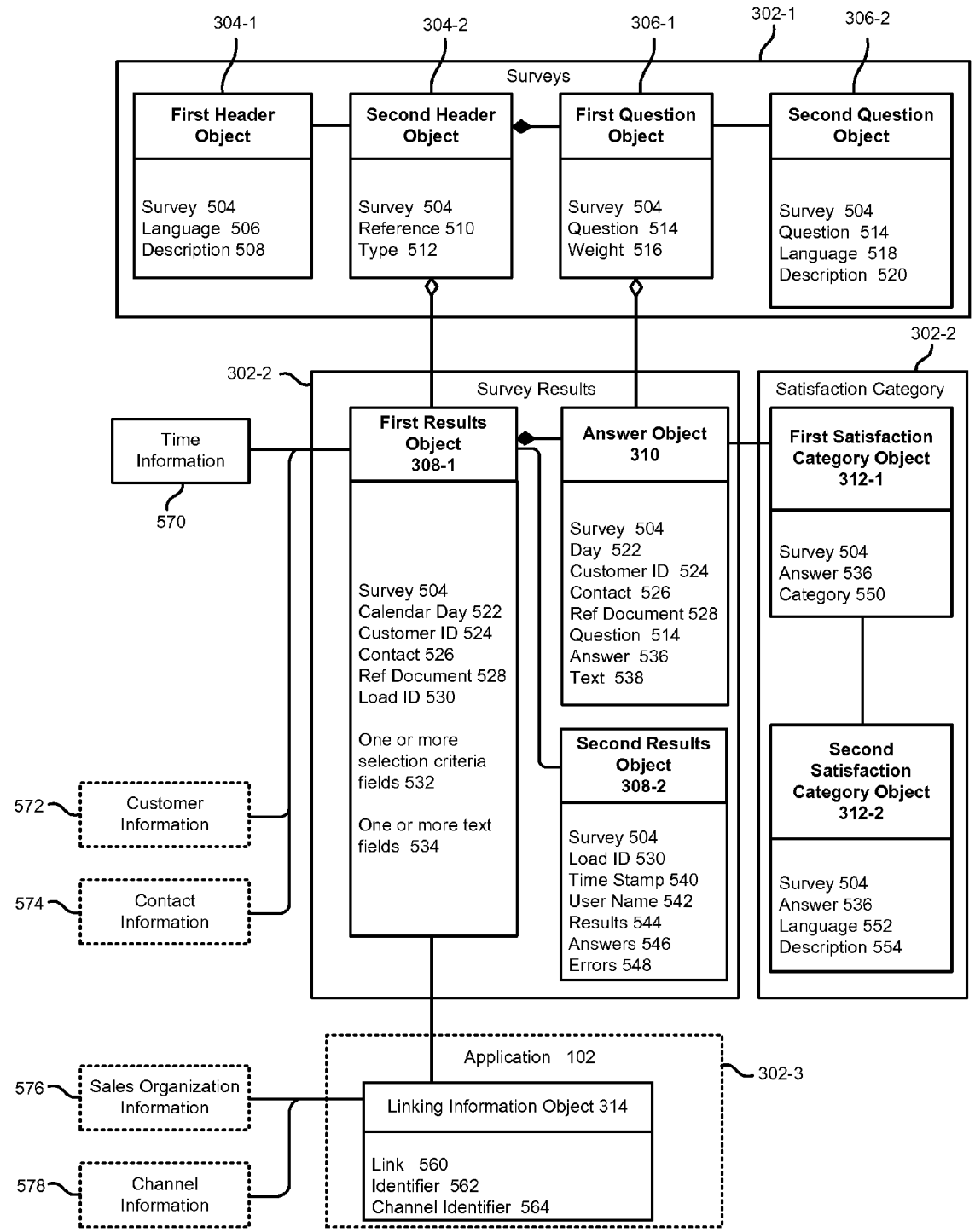
FIG. 3 illustrates a layered data model of the system of FIG. 1 according to an embodiment.

FIG. 3 illustrates the layered data model 122 according to an embodiment. For example, the layered data model 122 may include a first layer 302-1, a second layer 302-2, and a third layer 302-3, where each of the layers includes a plurality of objects, and each object includes one or more fields. Generally, the first layer 302-1 includes information regarding the surveys themselves. For example, the first layer 302-1 may include survey header information, and question information, which is populated by the survey metadata 200, e.g., the survey header 202, the survey description 208, the question weights 210, and the question descriptions 212.

The survey header information may include a first header object 304-1 and a second header object 304-2. The first header object 304-1 includes a plurality of fields such as a survey 504 that provides an identification number for the type of survey, a language 506 that provides language the survey, and a description 508 that provides a brief description of the survey. The second header object 304-2 includes the survey 504, and a reference 510 that contains a GUID, which represents a reference object, or the technical identifier of any object that the survey to. The reference 510 is used to link the survey to that object. Also, the second header object 304-2 includes a type 512 that represents the technical type of the survey's reference document. The type 512 is used by the application to filter the application specific data 104, so that it is possible to link a survey to different types of sale documents, for example.

The question information may include a first question object 306-1 including the SURVEY 504, a question 514 that is the technical identifier of the survey question, and a weight 516 that is the weighted value assigned to the question, and a second question object 306-2 including the survey 504, the question 514, and a description 520 that provides the text of the relevant question.

As shown in FIG. 3, the first header object 304-1 is linked to the second header object 304-2, which is linked to each of the questions defined by the survey including the first question object 306-1 and the second question object 306-2.

The second layer 302-2 may include the survey results and the satisfaction category information. For instance, the second layer 302-2 of the layered data model 122 may be populated with information from the survey metadata 200 (e.g., the satisfaction category information 214), the completed or partially completed survey 220 (e.g., the one or more answers 222 and the identification information 224), other information internally stored in the system 100, and one or more calculations performed by the logic unit 108. The second layer 302-2 may also include a plurality of objects such as a first results object 308-1, a second results object 308-2, and an answer object 310.

The first results object 308-1 may include the survey 504, a calendar day 522 that provides the calendar day, a customer ID 524 that provides the customer identification number, a contact 526 that provides the contact person identifier, i.e., the person that completed the survey form at the customer side, which may be a sales person or other person that is in charge of this survey. Also, the first results object 308-1 may include a reference document 528 that is similar to the reference 510 but on level of individual surveys (e.g. the specific sales document the survey is related to), and a load ID 530 that provides the technical identifier of the data upload process, which is used for data staging (e.g. re-upload survey data). Further, the first results object 308-1 may include one or more selection criterion fields 532 that provides selection criterion, which may be used by customers to define their own filtering and drill-down parameters for reporting, and one or more text fields 534 that represents the free-text replies of the person completing a survey.

The answer object 310 may include the survey 504, the calendar day 522, the customer ID 524, the contact 526, the reference document 528, the question 514, and an answer 536 that provides the answer value, and a text 538 that provides the text of the answer.

The second results object 308-2 may include the survey 504, the load ID 530, a time stamp 540 that provides time information regarding the time of uploading, a username 542 that provides the user who triggered the upload, results 544 that provides the number (count) of surveys loaded, the weighted answer values, the satisfaction scores, and the satisfaction categories, answers 546 that provides a number of answers loaded the answer values to the questions, and errors 548 that provides the number of errors during the upload.

The satisfaction category objects may include a first satisfaction category object 312-1 and a second satisfaction category object 312-2. The first satisfaction category object 312-1 may include the survey 504, an answer 536 that provides the answer values for purposes of determining the satisfaction scores, and category 550 that provides the satisfaction categories assigned to the answer values 536. The second satisfaction category object 312-2 includes the survey 504, the answer 536, a language 552 that provides the language of the satisfaction categories, and a description 554 that provides the description of the satisfaction categories.

According to the embodiments, survey results information of the second layer 302-2 may be linked to the surveys of the first layer 302-1. For example, the first results object 308-1 may be linked to the second header object 304-2, and the answer object 310 may be linked to the first question object 306-1. Also, within the second layer 302-2, the answer object 310 and the second results object 308-2 may be linked to the first results object 308-1. In addition, the satisfaction category information may be linked to the survey results, e.g., the first satisfaction category object 302-1 may be linked to the answer object 310, where the first satisfaction category object 302-1 and the second satisfaction category object 312-2 may be linked together.

Also, the second layer 302-2 may receive a plurality of external information such as time information 570 that presents the time information in a format understandable by the system 100, customer information 572 that provides the customer information for the companies/people for which the surveys are intended, and contact information 574 that provides contact information for one or more contact persons.

The third layer 302-3 essentially links the application specific data 104 with the second layer 302-2 and the first layer 302-1 via the linking information object 314. The linking information object 314 may include information that links the application specific data 104 with the survey results. For example, the linking information object 314 may include a link 560 that refers to the linked document contained the application specific data 104, an identifier 562 that provides an organization identifier such as a sales organization identifier, and a channel identifier 564 that identifies a distribution channel. In this example, the linking information object 314 may be linked to the first results object 308-1. Also, the third layer 302-3 may receive external data such as sales organization information 576 that provides the master data describing the sales organization, and channel information 578 that provides the master data describing the distribution channel.

Figure 4:
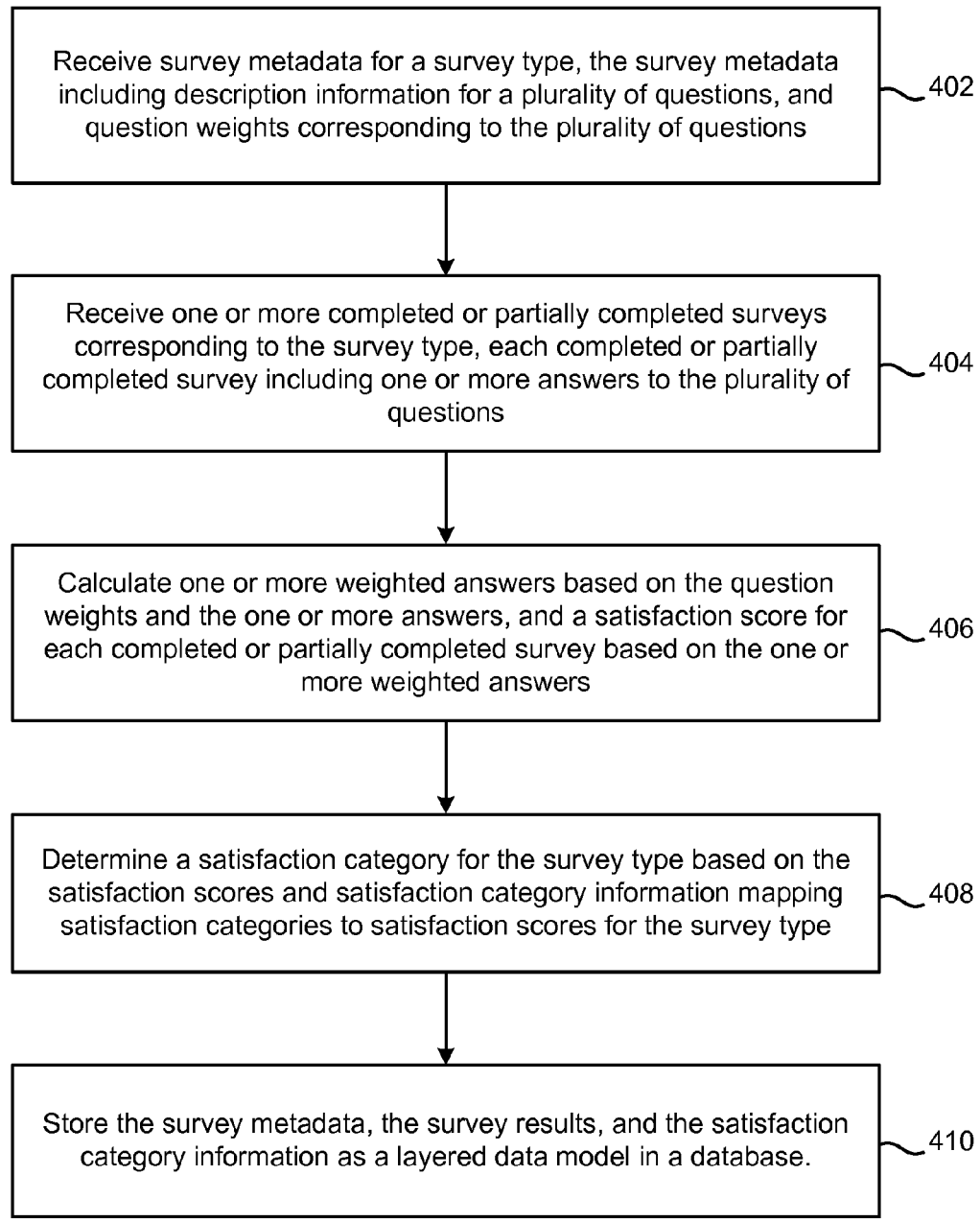
FIG. 4 is a flowchart illustrating example operations of the system of FIG. 1 according to an embodiment.

FIG. 4 is a flowchart illustrating example operations of the system 100 of FIG. 1 according to an embodiment. Although FIG. 4 is illustrated as a sequential, ordered listing of operations, it will be appreciated that some or all of the operations may occur in a different order, or in parallel, or iteratively, or may overlap in time.

Survey metadata for a survey type may be received, where the survey metadata includes description information for a plurality of questions, and question weights corresponding to the plurality of questions (402). For example, the survey metadata handler 110 may be configured to receive the survey metadata from the external source 106. For example, the survey metadata handler 110 may upload the survey metadata to the system 100 from the external source 106. In one example, the survey metadata handler 110 may receive a spreadsheet document that contains the survey metadata for a particular survey type. As such, the survey metadata handler 110 may receive a separate spreadsheet document for each type of survey. The survey metadata handler 110 may receive the survey metadata one time or at the beginning of an instantiation of a survey. However, the survey metadata handler 110 may receive updates or new survey metadata in the event that the survey metadata has changed (e.g., a different weight for a particular question, number of questions, etc.).

According to the embodiments, the survey metadata may include the information provided in FIG. 2 such as the question descriptions 212 and the question weights 210. The question descriptions 212 may include information providing a textual description of the questions and the corresponding technical identifier of each question. Further, the questions description 212 may include the type of language associated with each question. The question weights 210 may include identification information for questions (e.g., 224) such as the technical identifier of each question, and question weights corresponding to the questions. The question weights may include a numerical value such as a decimal value representing the weight assigned to each question in the survey. As such, each question weight may be paired with a technical identifier corresponding to the question.

One or more completed or partially completed surveys corresponding to the survey type may be received, where each completed or partially completed survey includes one or more answers to the plurality of questions (404). For example, the survey result handler 112 may be configured to receive the completed or partially completed surveys, e.g., the survey results. In other words, the survey result handler 112 may receive the answer values to the plurality of questions. The survey results may include answer values and corresponding textual descriptions of the answers. As such, the survey result handler 112 may receive one or more completed or partially completed surveys corresponding to each survey type handled by the system 100 (e.g., for which survey metadata is received). Each completed or partially completed survey may include one or more answers corresponding to the appropriate survey. In one example, the survey result handler 112 may receive the completed or partially completed survey(s) with the survey metadata. Alternatively, the survey result handler 112 may receive the completed or partially completed survey(s) after the survey metadata is received by the survey metadata handler 110.

Referring to FIG. 2, each completed or partially completed survey 220 may include one or more answers 222 and identification information 224 for the corresponding questions. The answers 222 may include answer values, which may be a numerical value such as an integer, for example. In addition, the completed or partially completed survey 220 may include the identification information 224 for each question, which may be the technical identifier of the question.

One or more weighted answers may be calculated based on the question weights and the one or more answers, and a satisfaction score for may be calculated for each completed or partially completed survey based on the one or more weighted answers (406). For example, the calculating unit 114 may be configured to perform calculations on the survey results, e.g., the completed or partially completed surveys 220. For example, the calculating unit 114 may be configured to calculate one or more weighted answers based on the question weights provided in the survey metadata and the answers provided in the completed or partially completed surveys. For example, the calculating unit 114 may calculate the weighted answer by multiplying an answer value by a corresponding question weight for each answer provided in each completed or partially completed survey.

A satisfaction category for the survey type may be determined based on the satisfaction scores and satisfaction category information mapping satisfaction categories to satisfaction scores for the survey type (408). For example, the category determining unit 116 may be configured to determine a satisfaction category for the survey type based on the calculated satisfaction scores for the completed or partially completed surveys and satisfaction category information. For instance, the satisfaction category information may be the customer-defined parameters that map different satisfaction categories to satisfaction scores. Generally, the satisfaction category information maps different categories (e.g., very satisfied, satisfied, unsatisfied, etc.) to different satisfaction scores, or a range of satisfaction scores. Therefore, depending on the calculated satisfaction scores, the category determining unit 116 may determine a particular satisfaction category.

The survey metadata, the survey results, and the satisfaction category information may be stored as a layered data model in a database (410). For example, the database 120 may be any type of database capable of storing data in a layered manner. In one particular embodiment, the database 120 may include in-memory database system that stores the survey metadata, the survey results, and the satisfaction category information as the layered data model 122.

Figure 5:
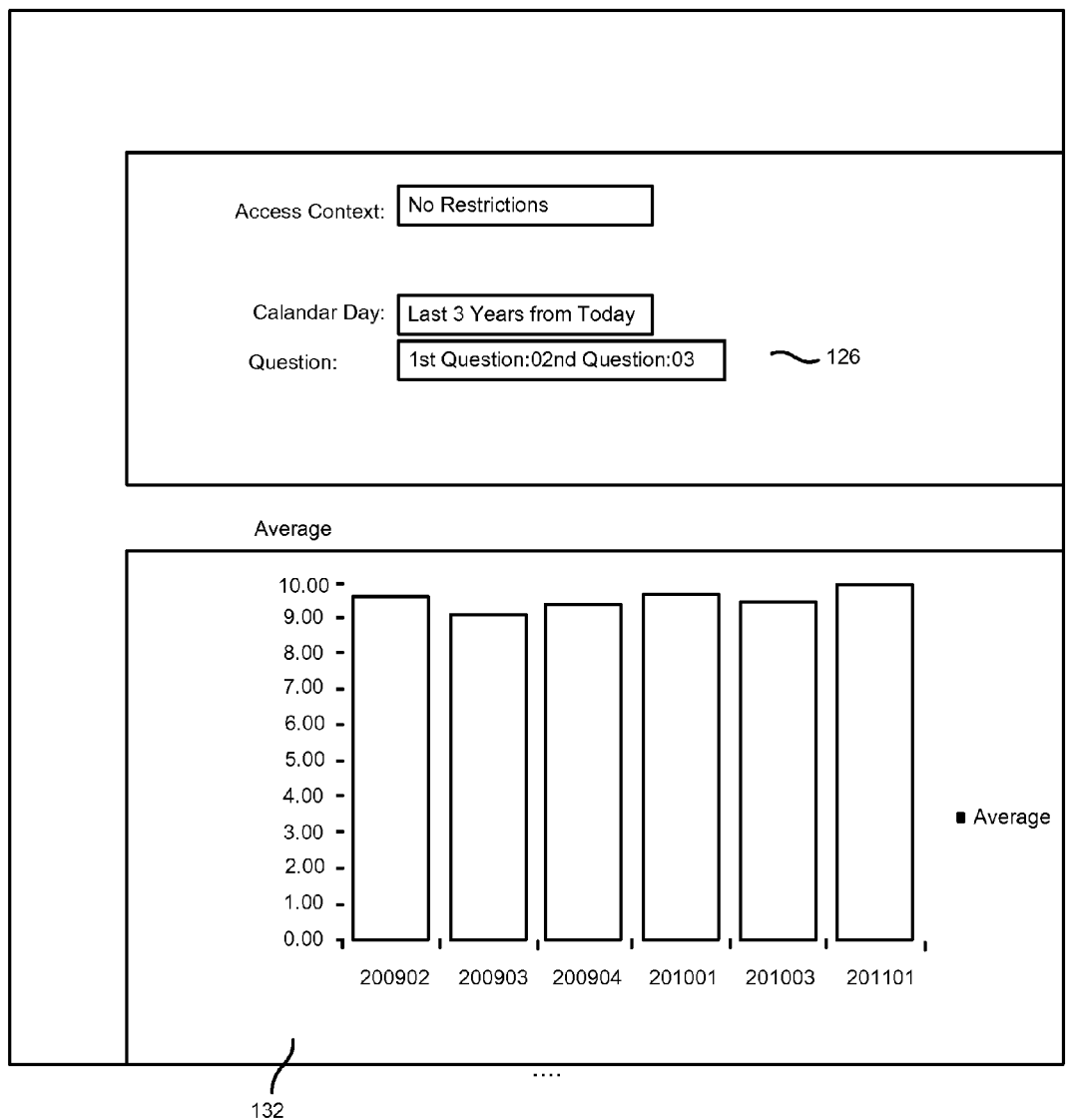
FIG. 5 illustrates a screen shot of an example report generated by the system of FIG. 1 according to an embodiment.

FIG. 5 illustrates a screen shot of an example report generated by the system of FIG. 1 according to an embodiment. For example, FIG. 5 illustrates the customer satisfaction by time period 132. The customer satisfaction by time period 132 report displays the satisfaction score as the average scores during a period of time (e.g., last 3 years to today) for a specified number of questions (e.g., 200902, 200903, etc.). For example, the customer satisfaction by time period 132 report provides the satisfaction score for each completed or partially completed survey (e.g., 200902, 200903, 200904, 201001, 201003, and 201101) corresponding to the specified questions and the time period provided by the report selection options 126. A user can adjust the report selection options 126 in order to modify the customer satisfaction by time period 132. For example, the user may specify the access context (e.g., no restrictions), the time period, and the questions of the survey.

FIG. 6 illustrates a screen shot of an example report generated by the system of FIG. 1 according to another embodiment. For example, FIG. 6 illustrates a detailed report of the customer satisfaction by survey 134. In this example, a detailed viewing of the submitted surveys are presented, which are grouped by customer, e.g., customer A, customer B, and customer C. With respect to Customer A, the customer satisfaction by survey 134 report lists the survey results for each submitted survey. With respect to a particular survey, the customer satisfaction by survey 134 report provides a weighted answer for each question in the report, as well as the satisfaction score (e.g., the result). In particular, with respect to survey 0000035118, the satisfaction score is 9.2. In addition, the customer satisfaction by survey 134 report provides the satisfaction score for each type of question, as well as the overall satisfaction score for the survey type, e.g., taking into account all the surveys, which is at the entry at the bottom right. Similar to FIG. 5, a user can adjust the report selection options 126 to modify the customer satisfaction by survey 134 report.

Figure 7:
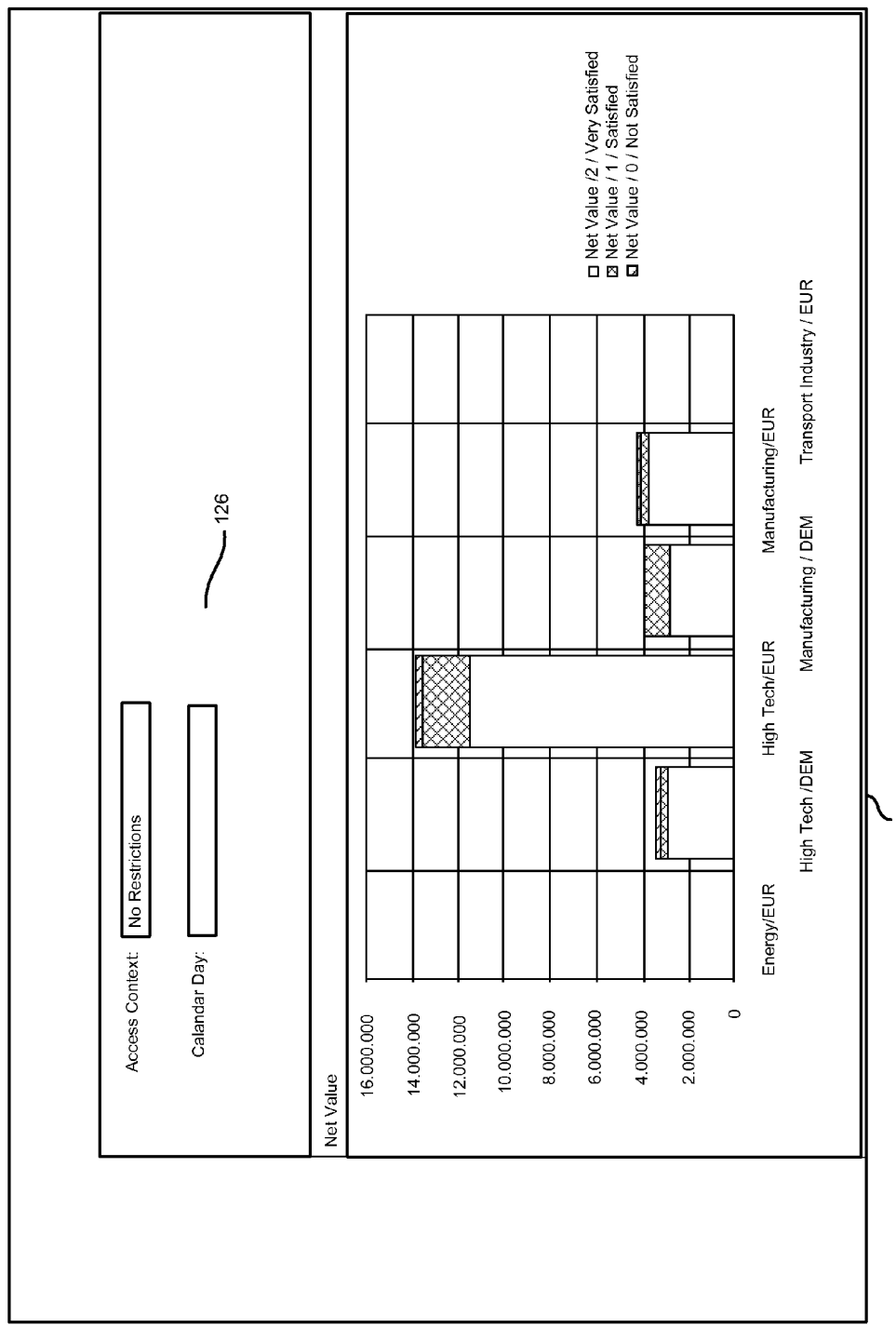
FIG. 7 illustrates a screen shot of an example report generated by the system of FIG. 1 according to another embodiment.

FIG. 7 illustrates a screen shot of an example report generated by the system of FIG. 1 according to another embodiment. Fro example, FIG. 7 illustrates the customer satisfaction by industry 136 report. Generally, the customer satisfaction by industry 136 report uses all the customer surveys for all types of surveys, and presents the customer satisfaction categories by type of industry, e.g., energy, high tech, manufacturing, etc. In this example, the customer satisfaction categories may include very satisfied, satisfied, and not satisfied, for example. Similar to FIGS. 5 and 6, a user can adjust the report selection options 126 in order to modify the customer satisfaction by industry 136.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for managing survey data, comprising:
at least one processor;
a non-transitory computer-readable storage medium including instructions executable by the at least one processor, the instructions configured to implement,
a survey result handler configured to collect surveys of a first survey type and collect surveys of a second survey type, the first type surveys including survey results having one or more answers to first questions, the second type surveys including survey results having one or more answers to second questions, the second type surveys relating to a different topic than the first type surveys,
the survey result handler configured to store the survey results in a layered database, the layered database having a first layer storing the first and second questions and question weights for the first and second questions, and a second layer storing the survey results of the first type surveys and the second type surveys, the second layer being linked to the first layer; and
a report generator configured to generate at least one report providing satisfaction results across the first type surveys and the second type surveys based on the question weights and the survey results of the first and second type surveys.

2. The system of claim 1, wherein the layered database includes a third layer having linking information that links application specific data with the survey results of the first type surveys.

3. The system of claim 1, wherein the system further comprises:
a calculating unit configured to calculate a first overall satisfaction score for the first type a surface based on the question weights for the first question and the survey results for the first type surveys, and a second overall satisfaction score for the second type surveys based on the question weights for the second questions and the survey results of the second type surveys.

4. The system of claim 3, wherein the second layer stores first category mapping information mapping satisfaction categories to scores for the first type surveys and second category mapping information mapping satisfaction categories to scores for the second type surveys, the system further comprising:
a category determining unit configured to determine a first satisfaction category for the first type surveys based on the first category mapping information and the first overall satisfaction score, and a second satisfaction category for the second type surveys based on the second category mapping information and the second overall satisfaction score.

5. The system of claim 1, further comprising:
a survey metadata handler configured to receive a change to the question weights for at least one of the first questions and the second questions.

6. The system of claim 1, wherein at least one of the first questions and the second questions are different questions.

7. The system of claim 1, wherein the satisfaction results of the at least one report includes an average score for each of the first questions within the first type surveys, and an average score for each of the second questions within the second type surveys.

8. The system of claim 1, wherein the satisfaction results of the least one report includes satisfaction scores across a plurality of industries.

9. The system of claim 1, further comprising:
a survey metadata handler configured to receive survey metadata from an external source, the survey metadata including the first questions, the second questions, and the question weights for the first questions and the second questions, each of the first and second questions being associated with an identifier, the survey metadata handler configured to store the survey metadata within the first layer of the layered database.

10. A method for managing survey data performed by at least one processor, comprising:
    collecting, by the at least one processor, surveys of a first survey type and surveys of a second survey type, the first type surveys including survey results having one or more answers to first questions, the second type surveys including survey results having one or more answers to second questions, the second type surveys relating to a different topic than the first type surveys;
    storing, by the at least one processor, the survey results in a layered database, the layered database having a fist layer storing the first and second questions and question weights for the first and second questions, And a second layer storing the survey results of the first type surveys and the second type surveys, the second layer being linked to the first layer; and
    generating, by the at least one processor, at least one report providing satisfaction results across the first type surveys and the second type surveys based on the question weights and the survey results of the first and second type surveys.

11. The method of claim 10, wherein the layered database includes a third layer having linking information that links application specific data with the survey results of the first type surveys.

12. The method of claim 10, further comprising:
    calculating, by the at least one processor, a first overall satisfaction score for the first type surveys based on the question weights for the first questions and the survey results for the first type surveys, and a second overall satisfaction score for the second type surveys based on the question weights for the second questions and the survey results of the second type surveys.

13. The method of claim 10, wherein the second layer stored first category mapping information mapping satisfaction categories to scores for the first type surveys and second category mapping information mapping satisfaction categories to scores for the second type surveys.

14. The method of claim 13, further comprising:
    determining, by the at least one processor, a first satisfaction category for the first type Surveys based on the first category mapping information and the first overall satisfaction score, and a second satisfaction category for the second type surveys based on the second category mapping information and the second overall satisfaction score.

15. The method of claim 10, further comprising:
    receiving, by the at least one processor, a change to the question weights for at least one of the first questions and the second questions.

16. The method of claim 10, wherein at least one of the first questions and the second questions are different questions.

17. The method of claim 10, wherein the satisfaction results of the at least one report includes an average score for each of the first questions within the first type surveys, and an average score for each of the second questions within the second type surveys.

18. The method of claim 10, wherein the satisfaction results of the at least one report includes satisfaction scores across a plurality of industries.

19. A computer program product tangibly embodied on a non-transitory computer-readable storage medium and including executable code that, when executed, is configured to cause a system to:
    collect surveys of a first survey type and surveys of a second survey type, the first type surveys including survey results having one or more answers to first questions, the second type surveys including survey results having one or more answers to second questions, the second survey type relating to a different topic than the first survey type;
    store the survey results in a layered database, the layered database having a first layer Storing the first and second questions and associated question weights, and a second layer storing first category mapping information mapping satisfaction categories to scores for the first type surveys and second category mapping information mapping satisfaction categories to score for the second type surveys, the second layer being linked to first layer;
    calculate a first overall satisfaction score for the first type surveys and a second overall satisfaction score for the second type surveys based on the question weights and the survey results of the surveys of the first type and the second type;
    determine a first satisfaction category for the first type surveys based on the first category mapping information and the first overall satisfaction score, and a second satisfaction category for the second type surveys based on the second category mapping information an the second overall satisfaction score; and
    a report generator configured to generate at least one report providing the first and second overall satisfaction scores.

20. The computer program product of claim 19, wherein the layered database includes a third layer having linking information that links application specific data with the survey results of the first type surveys.

* * * * *